United States Patent
Schleeh

(10) Patent No.: US 8,049,520 B2
(45) Date of Patent: Nov. 1, 2011

(54) SYSTEM FOR CAPACITIVE DETECTION OF A SEAT OCCUPANCY

(75) Inventor: Thomas Schleeh, Schweich (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 53 days.

(21) Appl. No.: 11/599,712

(22) Filed: Nov. 15, 2006

(65) Prior Publication Data

US 2007/0115121 A1 May 24, 2007

(30) Foreign Application Priority Data

Nov. 22, 2005 (EP) .................................. 05111099

(51) Int. Cl.
G01R 27/26 (2006.01)

(52) U.S. Cl. ........ 324/663; 280/735; 340/562; 177/144; 297/180.11; 73/779

(58) Field of Classification Search .................... 324/663
See application file for complete search history.

(56) References Cited

U.S. PATENT DOCUMENTS

| | | | |
|---|---|---|---|
| 5,467,022 A | 11/1995 | Aoki et al. | |
| 5,525,843 A | 6/1996 | Howing | |
| 6,199,902 B1 | 3/2001 | Copper et al. | |
| 6,275,146 B1 | 8/2001 | Kithil et al. | |
| 6,703,845 B2 * | 3/2004 | Stanley et al. | 324/663 |
| 6,724,609 B2 * | 4/2004 | Sun et al. | 361/234 |
| 6,825,765 B2 * | 11/2004 | Stanley et al. | 340/561 |
| 6,927,678 B2 * | 8/2005 | Fultz et al. | 340/438 |
| 7,217,891 B2 * | 5/2007 | Fischer et al. | 177/144 |
| 7,362,225 B2 * | 4/2008 | Rittmueller et al. | 340/562 |
| 2001/0019272 A1 | 9/2001 | Eisenmann et al. | |
| 2002/0067058 A1 * | 6/2002 | Pfahler | 297/180.11 |
| 2005/0275202 A1 * | 12/2005 | Wato et al. | 280/735 |
| 2006/0005630 A1 * | 1/2006 | Jitsui et al. | 73/779 |

FOREIGN PATENT DOCUMENTS

| | | |
|---|---|---|
| DE | 195 47 842 | 6/1997 |
| DE | 101 44 878 | 9/2002 |
| EP | 0 891 898 | 1/1999 |
| EP | 1 457 391 | 9/2004 |
| LU | 88 828 | 4/1998 |
| WO | WO 98/14345 | 4/1998 |
| WO | WO 99/39168 | 8/1999 |

OTHER PUBLICATIONS

International Search Report; PCT/EP2004/050274; Jun. 16, 2004.
European Search Report; Application No. EP 05 11 1099; Apr. 5, 2006.

* cited by examiner

*Primary Examiner* — Melissa Koval
*Assistant Examiner* — Benjamin M Baldridge
(74) *Attorney, Agent, or Firm* — Cantor Colburn LLP

(57) ABSTRACT

A system for capacitive detection of seat occupancy in a vehicle comprises a sensing electrode and a shielding electrode arranged in substantially parallel layers. A spacer is arranged between the sensing electrode and the shielding electrode to keep the sensing electrode and the shielding electrode at a certain distance from each other. The spacer comprises an inner textile layer and at least one of the electrodes comprises a film-based electrode.

22 Claims, 2 Drawing Sheets

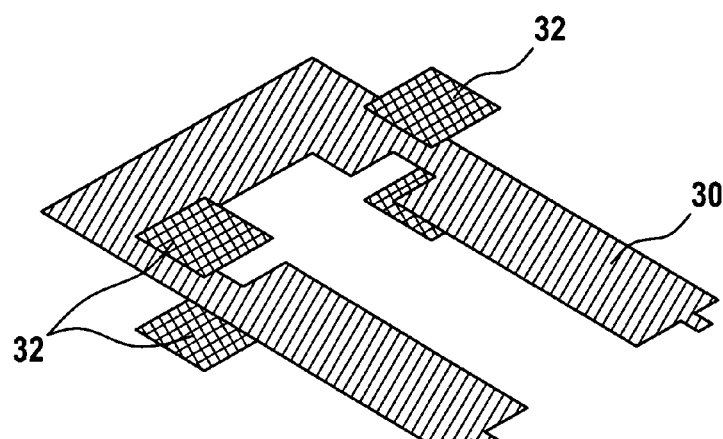
Fig. 4
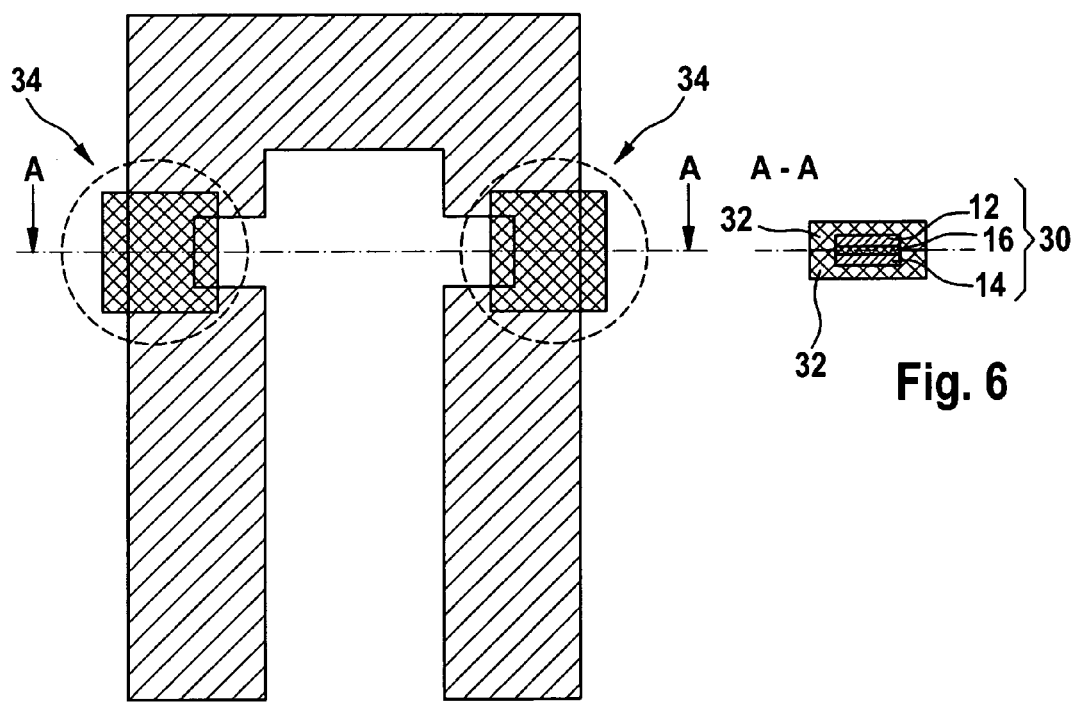
Fig. 5
Fig. 6

US 8,049,520 B2

SYSTEM FOR CAPACITIVE DETECTION OF A SEAT OCCUPANCY

TECHNICAL FIELD

The present invention generally relates to automotive occupancy sensor systems for determining the presence of an object or a passenger in a seat, in order to provide an occupancy state signal or condition signal for use with a safety restraint system control. The present invention more particularly relates to a capacitive seat occupancy detection system.

BACKGROUND ART

In order to protect the lives of passengers during a traffic accident, modern vehicles are generally provided with a protection system comprising several airbags and seat belt pretensioners, which are used to absorb the energy of a passenger released during the collision due to the accident. It is clear that such protection systems are most effective when they are well adapted to the specific requirements of actual seat occupancy. That is why microprocessor-controlled protection systems have been designed which provide several operational modes, allowing for example an adaptation of the instant at which airbags are deployed, the volume to which the airbags are inflated, the instant at which safety belts are released after the collision, etc, as a function of the stature of a passenger on the seat. In order to enable the control microprocessor to select the optimum operational mode for a given seat occupancy status, it is of course necessary to detect one or several parameters characterizing the occupancy status of the seat and to classify the occupancy into one of several classes, each of which is associated to a specific operational mode of the restraint system.

One approach for gathering relevant parameters of seat occupancy is based on the detection of the capacitive coupling of a body to one or several electrodes arranged in the seat. Such a measurement system is for instance described in LU-A-88 828. This measurement system comprises at least one transmitting electrode and at least one receiving electrode that are capacitively coupled by a conductive body. The receiving electrodes are connected to an analysis circuit that determines the capacitive coupling of the transmitting antenna with the conductive body by comparing the measured signal with a reference signal.

Various other systems have been disclosed with electrodes arranged at different locations in the passenger compartment in order to detect the presence and/or the nature of seat occupancy and to classify the occupancy status in one of several classes.

European patent application EP 1 457 391 A1 discloses a system for the detection of seat occupancy in a vehicle, which comprises a capacitive seat electrode and a capacitive foot-area electrode arranged in a compartment of the vehicle. During operation, capacitive coupling between the seat electrode and an object placed on the seat is determined, as well as capacitive coupling between the foot-area electrode and the seat electrode. The seat electrode comprises a shielding electrode (guard electrode), directed towards the seat frame, and a sensing electrode, directed towards the occupant of the seat. An insulating layer is arranged between the sensing electrode and the shielding electrode. In operation, the shielding electrode and the sensing electrode are driven by the same signal, so that the guard electrode prevents the electric field from the sensing electrode to couple with the seat frame. Thus the sensing electrode is active only in the direction of a seat occupant and not towards an object placed below the seat.

Integration of electrodes into the compartment of a vehicle implies certain requirements to the configuration of the electrodes in terms of mechanical robustness, protection against humidity or water, and comfort.

OBJECT OF THE INVENTION

It is an object of the present invention to provide an improved system for capacitive detection of seat occupancy in a vehicle. This object is achieved by a system as claimed in claim 1.

GENERAL DESCRIPTION OF THE INVENTION

A system for capacitive detection of seat occupancy in a vehicle, comprises a sensing electrode and a shielding electrode arranged in substantially parallel layers. A spacer is arranged between the sensing electrode and the shielding electrode to keep the sensing electrode and the shielding electrode at a certain distance from each other. According to an important aspect of the invention, the spacer comprises an inner textile layer and at least one of the electrodes comprises a film-based electrode. In contrast to combining textile electrodes with a textile spacer, or likewise, combining film-based electrodes with a film spacer, the present invention proposes a combination of a textile spacer layer and at least one film-based electrode. Preferably, both the electrodes comprise a film-based electrode. The inner textile layer may include any woven, knitted or felted material, e.g. a spacer fabric or a warp-knitted spacer fabric. It should be noted that the spacer may comprise two or more inner textile layers of same or different constitution.

Capacitive detection with such a capacitive detection system may involve feeding a current with a DC component to the electrodes. If humidity is present between the two electrodes, the DC component of the current may cause electrolysis. It is preferable, therefore, to provide the electrodes with some protection against electrolysis. Anti-electrolysis measures may involve using Ni—Cu electrodes instead of silver electrodes. Alternatively or additionally, the electrodes may comprise or be coated with a sealing layer. As will be appreciated, a film-based electrode with a sealing layer is generally less expensive than a comparable textile electrode with a sealing layer. The sealing layer of the film-based electrode(s) may, for instance, comprise a dielectric film, a PET or a PEN film or any other film, which is impermeable to water or humidity.

As will further be appreciated, the haptic properties of a capacitive detection system according to the present invention may be greatly enhanced with respect to an all-film-based system (i.e. having both film-based spacer and film-based electrodes). Whereas all-film-based systems are often to stiff to be integrated under the cover of a vehicle seat, because seating comfort would suffer, systems having a textile spacer layer arranged between two film-based electrodes can be easily designed to meet with haptic requirements. Preferably, the spacer substantially consists of textile material. In the present context, "substantially consisting" is used in the sense that the mechanical properties of the spacer are dominated by the textile material. Such a spacer substantially consisting of textile material may, for instance, comprise an intermediate film layer (e.g. a thin moisture barrier layer), which does not significantly affect the mechanical behaviour of the spacer, e.g. in terms of flexibility, compressibility, resilience, shear strength and/or tensile strength. Of course, the spacer may also consist exclusively of textile material.

According to a preferred embodiment of the invention, the at least one film-based electrode comprises a film substrate and a conductive layer applied on the substrate. The film substrate may e.g. comprise a PET film, a PEN film or another synthetic film. The conductive layer may e.g. comprise a metal or carbon layer, deposited, printed, laminated or otherwise applied on the film substrate. Preferably, the film-based electrode comprises a protective layer coating the conductive layer so as to prevent corrosion or electrolysis. The protective layer may e.g. be made of thermoplastic material, rubber or other plastic material.

A first outer textile layer may be arranged on the first side of the sensing electrode, which first side faces away from the spacer and the shielding electrode as opposed to the second side of the sensing electrode, which faces to the spacer and the shielding electrode. A second outer textile layer may be arranged on the second side of the shielding electrode, which second side faces away from the spacer and the sensing electrode, as opposed to the first side of the shielding electrode, which faces to the spacer and the sensing electrode. The outer textile layers, as well as the inner textile layer, may have a protective and/or a strengthening function. For instance, each one of the textile layers may be made of water repellent material. Most preferably, the first and/or second outer textile layer and/or the inner textile layer comprise a reinforcement pad at least in a region where the system is to be fixed to a vehicle seat. As part of a textile layer, the reinforcement pad preferably substantially consists of robust textile material, i.e. its mechanical properties are dominated by textile material. Such a reinforcement pad considerably reduces stress on the film-based electrodes and thus lowers the risk of damage to them.

There are several techniques of fixing the system to a vehicle seat, including gluing, ultrasonic welding, or sewing. In case of sewing, however, the sewing needle may perforate the film-based electrodes. Such perforations may damage the protective layer of the electrodes and furthermore allow water to penetrate between the electrodes. Hence, there is an increased risk for corrosion of the electrodes in the region where the system is fixed to the seat. Moreover, the perforations are potential weak points of the film-based electrodes. Under strain, the films of the electrodes are likely to tear in those regions. As will be appreciated, a reinforcement pad reduces stress on the film-based electrodes. Preferably, such a reinforcement pad is bonded to the film-based electrodes in the region of fixation to the seat. The reinforcement pad advantageously comprises a non-tear fabric so as to prevent cracks or fissures in the film-based electrodes from propagating.

To further reduce the risk of damage to the film-based electrodes, the conductive layer may have one or more gaps in the region where the system is to be fixed to a vehicle seat. These gaps are preferably disposed at those points where the sewing needle perforates the electrodes, so that the needle does not damage the conductive layer. It should be noted that the film-based electrodes may also have holes for the needle that are prepared in advance to the sewing, e.g. by perforation with a cutting tool, a laser, etc. Preparing the holes in advance has the advantage that the smoothness of the hole edges can be better controlled than with a sewing needle. As a matter of fact, the smoother the edges are, the lesser is the risk of cracks or fissures.

BRIEF DESCRIPTION OF THE DRAWINGS

Preferred embodiments of the invention will now be described, by way of example, with reference to the accompanying drawings in which:

FIG. 4: is an exploded 3-dimensional view of a sandwiched electrode arrangement with reinforcement pads;

FIG. 5: is a top view of the sandwiched electrode arrangement of FIG. 4;

FIG. 6: is a cross-sectional view of the of the sandwiched electrode arrangement along the line A-A of FIG. 5.

DESCRIPTION OF PREFERRED EMBODIMENTS

Figure 1:
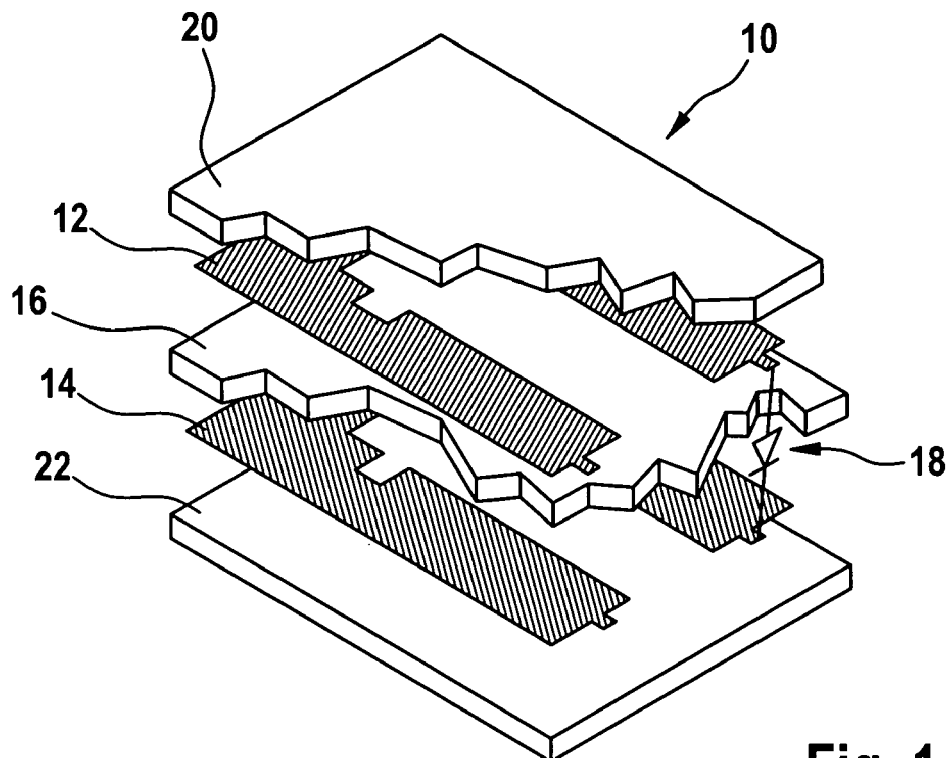
FIG. 1: is an exploded 3-dimensional view of a capacitive occupancy detection system according to the invention.

FIG. 1 schematically represents an embodiment of a system for detecting seat occupancy 10. The system 10 comprises a film-based sensing electrode 12 and a film-based shielding electrode 14, which are arranged in two substantially parallel layers. For operation, the system is integrated into the compartment of a vehicle, e.g. in the seating or the backrest of a vehicle seat, so that the shielding electrode 14 is directed towards the seat frame and the sensing electrode 12 is directed towards an occupant of the seat. A textile spacer layer 16 is arranged between the two electrodes 12, 14, which electrically insulates the electrodes 12, 14 from each other. The textile spacer layer 16 may be a sheet of felt, a woven or knitted fabric, a warp-knitted spacer fabric, or any combination thereof. The combination of textile spacer 16 and film-based electrodes 12, 14 renders the sandwiched structure less stiff than an all-film-based configuration. As the system 10 is less noticeable by touch, it provides for enhanced seating comfort, if integrated into the vehicle seat. The electrodes 12, 14 shown in the figures are generally U-shaped, which increases their flexibility with respect to generally convex electrodes of similar outer dimensions. It should be noted that differently shaped electrodes may be suitable as well, e.g. W-, E-, H-shaped electrodes, etc.

The electrodes 12, 14 are connected in series to a voltage source (not shown), which drives the electrodes 12, 14 during operation by the same voltage, so that the shielding electrode 14 prevents the electric field of the sensing electrode 12 from coupling with the seat frame. A diode 18 is electrically arranged between the sensing electrode 12 and the shielding electrode 14, in such a way that the transmitting direction of the diode is from the sensing electrode 12 to the shielding electrode 14.

A first outer textile layer 20 is arranged on the side of the sensing electrode 12 that faces away from the spacer 16. A second outer textile layer 22 is arranged on the side of the shielding electrode 14 that faces away from the spacer 16. The outer textile layers 20, 22 may comprise a sheet of felt, a woven or knitted fabric, a warp-knitted spacer fabric, or any combination thereof. The outer textile layers 20, 22 may improve the haptic properties of the system 10 and/or provide further reinforcement to it.

Figure 2:
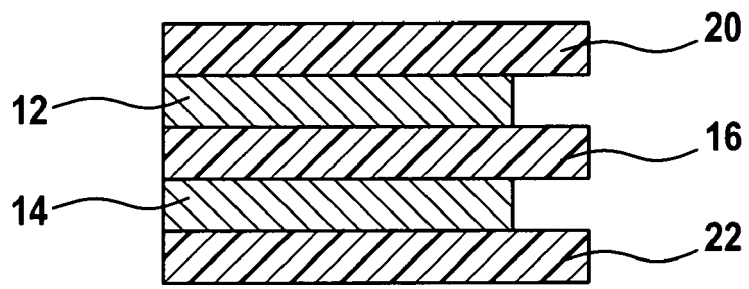
FIG. 2: is a cross-sectional schematic view showing the layered structure of the system of FIG. 1.

FIG. 2 illustrates the layered structure of the occupant detection system. Preferably, the electrodes 12, 14 and the textile layers 16, 20, 22 are bonded together on substantially their entire contact surfaces. The textile layers 16, 20, 22 and the electrode layers 12, 14 may be bonded together by hot-melt adhesive. Alternative techniques, e.g. ultrasonic welding, can also be used.

Figure 3:
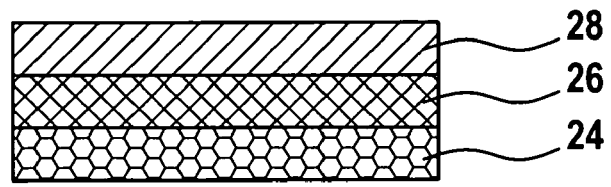
FIG. 3: is a cross-sectional schematic view of a film-based electrode

An exemplary structure of the film-based electrodes is shown in FIG. 3. The film-based electrode comprises a film substrate layer 24, e.g. made of PET or PEN, a conductive layer 26 (e.g. silver or nickel-copper alloy) applied on the substrate layer 24 and a sealing layer in the form of a protective coating 28 on top of the conductive layer 26. Application of the conductive layer 26 on the substrate layer 24 is preferably done by printing. The conductive layer 26 is protected against water (electrolysis) or chemicals from the bottom by the substrate 24 and from the top by the protective coating 28 (e.g. pressure sensitive adhesive, lacquer, foam, gel or other). In the areas of electrical connections, one may use potting by hot-melt, gel, or any other liquid tight, chemically and mechanically stable material, to protect the conductive layers.

The thickness of the substrate layer 24 is preferably lower than 150 µm, more preferably, lower than 75 µm. Thin electrodes may provide for high comfort; on the other hand, their mechanical robustness decreases with their thickness. According to an aspect of the invention, the electrodes are thus reinforced by the textile spacer layer and/or the outer textile layers.

A further embodiment of a system for detecting seat occupancy is now discussed with reference to FIGS. 1-6, in particular FIGS. 4-6. FIG. 4 shows an exploded 3-dimensional view of a sandwich arrangement 30, i.e. the combination of sensing electrode 12, spacer 16 and shielding electrode 14, with water-repellent reinforcement pads 32 in the regions 34 where the sandwich arrangement 30 is to be fixed to the vehicle seat. The reinforcement pads 32 comprise a non-tear fabric, and they are bonded to the sandwich arrangement 30 essentially on the entire contact surface between the pads 32 and the sandwich arrangement 30. The pads 32 prevent cracks or fissures in the film-based electrodes 12, 14 from propagating further. The embodiment shown in FIGS. 4, 5, and 6 is well suited for being sewn into a vehicle seat. For sake of example, it is assumed that sewing takes place along the line A-A. The needle perforates the sandwich arrangement 30 in the areas 34, whereby the film layers 24, 26, 28 are damaged. On the other hand, the textile layers 16, 32 remain intact, as the needle just pushes the textile fibres out of its way. The perforations in the film layers 24, 26, 28 constitute potential weak points, from which cracks or fissures might originate and propagate. The reinforcement pads 32 reduce the strain on the film layers 24, 26, 28 significantly, so that the risk of formation of cracks or fissures is considerably decreased as well.

It should further be noted that the perforations through the film-based electrodes 12, 14 might allow water to penetrate between the two electrodes 12, 14 and cause corrosion at those points, where the protective coating 28 is damaged. The water-repellent reinforcement pads 32 also reduce this risk.

The invention claimed is:

1. A vehicle seat containing a system for capacitive detection of a seat occupancy in a vehicle, comprising:
a sensing electrode and a shielding electrode arranged in substantially parallel layers in the vehicle seat, and a spacer arranged between said sensing electrode and said shielding electrode to keep said sensing electrode and said shielding electrode at a certain distance from each other, wherein said shielding electrode is configured to cancel at least a portion of an electric field from said sensing electrode, wherein said spacer comprises an inner textile layer, said inner textile layer being a warp-knitted textile fabric, wherein at least one of said electrodes comprises a film-based electrode, and wherein each of said sensing electrode and said shielding electrode are bonded to said inner textile layer in the vehicle seat.

2. The system according to claim 1, wherein both said sensing electrode and said shielding electrode comprise a film-based electrode.

3. The system according to claim 1, wherein said spacer substantially consists of textile material.

4. The system according to claim 1, wherein said at least one film-based electrode comprises a film substrate and a conductive layer applied on said substrate.

5. The system according to claim 4, wherein the conductive layer of said film-based electrode has at least one gap in a region where said system is to be fixed to a vehicle seat.

6. The system according to claim 1, wherein said sensing electrode has a first side facing away from said spacer and said shielding electrode and a second side facing to said spacer and said shielding electrode and wherein said system comprises a first outer textile layer arranged on said first side of said sensing electrode.

7. The system according to claim 6, wherein said first outer textile layer is water repellent.

8. The system according to claim 6, wherein said first outer textile layer comprises a reinforcement pad in a region where said system is to be fixed to a vehicle seat.

9. The system according to claim 1, wherein said shielding electrode has a first side facing to said spacer and said sensing electrode and a second side facing away from said spacer and said sensing electrode and wherein said system comprises a second outer textile layer arranged on said second side of said shielding electrode.

10. The system according to claim 9, wherein said second outer textile layer is water repellent.

11. The system according to claim 9, wherein said second outer textile layer comprises a reinforcement pad in a region where said system is to be fixed to a vehicle seat.

12. The system according to claim 1, wherein said inner textile layer is water repellent.

13. The system according to claim 1, wherein said inner textile layer comprises a reinforcement pad in a region where said system is to be fixed to a vehicle seat.

14. The system according to claim 1, wherein said film-based electrode comprises a sealing layer for protecting said film-based electrode against electrolysis.

15. A vehicle seat containing a system for capacitive detection of a seat occupancy in a vehicle, comprising:
a sensing electrode and a shielding electrode arranged in substantially parallel layers in the vehicle seat, wherein said shielding electrode is configured to cancel at least a portion of an electric field from said sensing electrode, and
a spacer arranged between said sensing electrode and said shielding electrode to keep said sensing electrode and said shielding electrode at a certain distance from each other, wherein said spacer comprises an inner textile layer, and
wherein at least said shielding electrode comprises a film-based electrode, said film-based electrode including a film substrate, a conductive layer applied on said film substrate and a protective layer coating said conductive layer;
wherein said inner textile layer comprises a reinforcement pad made of non-tear fabric bonded to said film-based electrode in a region where said system is to be fixed to said vehicle seat.

16. A vehicle seat containing a system for capacitive detection of a seat occupancy in a vehicle, comprising:
a sensing electrode and a shielding electrode arranged in substantially parallel layers in the vehicle seat, wherein said shielding electrode is configured to cancel at least a portion of an electric field from said sensing electrode, and a spacer arranged between said sensing electrode and said shielding electrode to keep said sensing electrode and said shielding electrode at a certain distance from each other, said sensing electrode, said spacer and said shielding electrode forming a sandwich arrangement, wherein said spacer comprises an inner textile layer, and wherein at least one of said electrodes comprises a film-based electrode, wherein the system comprises a first outer textile layer and a second outer textile layer, wherein said first and second outer textile layers comprise a first and a second reinforcement pad, respectively, said first and second reinforcement pads being made of non-tear fabric, said first reinforcement pads being bonded to said shielding electrode in a region where said system is to be fixed to a vehicle seat, said second reinforcement pad being bonded to said sensing electrode in said region, and wherein said first and second reinforcement pads join to surround said sandwich arrangement in said region.

17. The system according to claim 16, wherein said first and second reinforcement pads join to radially enclose said sandwich arrangement at an exposed surface thereof in said region.

18. The system according to claim 16, wherein said sandwich arrangement is sewn to said vehicle seat via a thread that passes through each of said first and second reinforcement pads, said sensing electrode, said shielding electrode, and said spacer.

19. A vehicle seat containing a system for capacitive detection of a seat occupancy in a vehicle, comprising:

a sensing electrode and a shielding electrode arranged in substantially parallel layers in the vehicle seat, wherein said shielding electrode is configured to cancel at least a portion of an electric field from said sensing electrode, and a spacer arranged between said sensing electrode and said shielding electrode to keep said sensing electrode and said shielding electrode at a certain distance from each other, wherein said spacer comprises an inner textile layer, said inner textile layer including a felted material, and wherein at least said shielding electrode comprises a film-based electrode, said film-based electrode including a film substrate, a conductive layer applied on said film substrate and a protective layer coating said conductive layer, said conductive layer being deposited, printed or laminated on said film substrate.

20. The system according to claim 19, wherein, further to said shielding electrode, said sensing electrode is a film-based electrode, and wherein each of said film-based electrodes including a film substrate, a conductive layer applied on said film substrate and a protective layer coating said conductive layer, said conductive layer being deposited, printed or laminated on said film substrate.

21. The system according to claim 20, wherein said spacer essentially consists of said felted material.

22. The system according to claim 20, wherein said spacer consists of said felted material.

* * * * *